United States Patent Office 3,796,655
Patented Mar. 12, 1974

3,796,655
METHOD FOR DIMINISHING PRESSURE DROP WITHIN A CATALYST BED
John M. Armistead, Bethel Park, Pa., and Joseph K. Kosiba, Port Arthur, Tex., assignors to Gulf Oil Corporation, Pittsburgh, Pa.
Original application Mar. 18, 1970, Ser. No. 20,744, now Patent No. 3,702,238. Divided and this application May 22, 1972, Ser. No. 255,729
Int. Cl. C10g 23/02
U.S. Cl. 208—216
17 Claims

ABSTRACT OF THE DISCLOSURE

The hydrodesulfurization of a crude oil or a reduced crude containing the asphaltene fraction proceeds at unexpectedly low temperatures when utilizing a catalyst comprising a Group VI and Group VIII metal on alumina wherein the catalyst particles are very small and have a diameter between about 1/20 and 1/40 inch, and the feed is passed in downflow operation over a fixed bed of the catalyst. The low temperature advantage depends upon high hydrogen pressure and the process is pressure drop limited rather than catalyst activity limited. An abrupt pressure drop increase is primarily due to a formation of crust at the top of the catalyst bed. When the pressure drop across this upper layer of the bed increases to a predetermined value the force of the pressure drop itself is utilized to provide a sudden surge of reactant fluid directly to the underside of the crust to dislodge the particles constituting the crust and lower the pressure drop across the top of the bed. This invention can be applied to other fixed bed processes wherein fouling at the top of the bed represents a process limitation.

Figure 1:
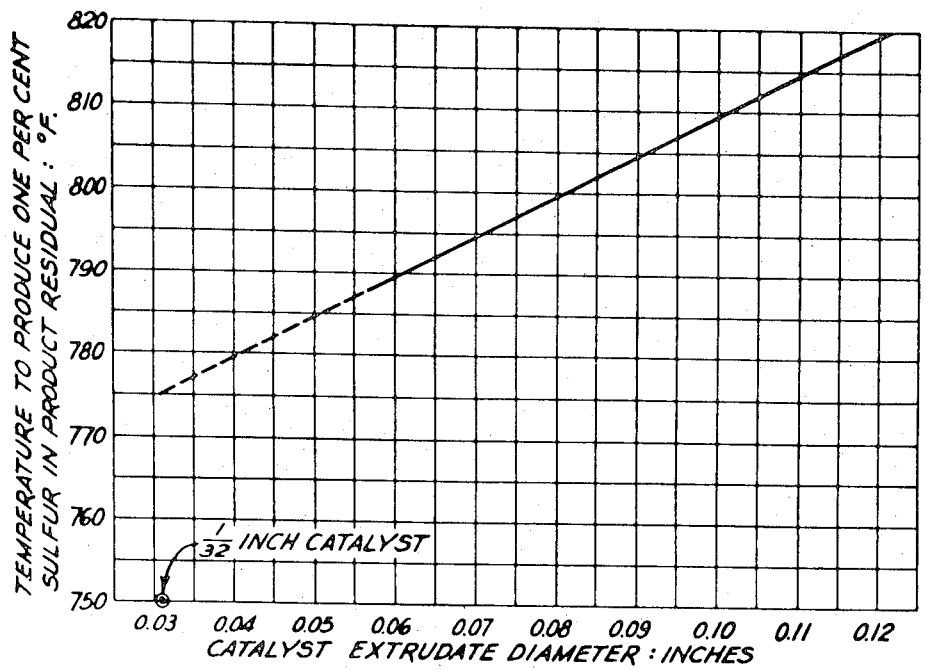

This application is a division of Ser. No. 20,744 filed Mar. 18, 1970, now U.S. Pat. 3,702,238.

Many processes involve the passage of hydrocarbon liquid and vapor and hydrogen through a fixed non-fluid bed of catalyst without addition or removal of catalyst during the process. Such processes include hydrodesulfurization of oils containing the asphaltene fraction, hydrocracking of crude and other oils and hydrofining processes for the production of lubricating oils. In such processes the residual hydrocarbon oil charge often contains contaminative solids which are removed generally in about the top one, five or ten percent of the catalyst bed, primarily in the top one percent, forming a crust or coke deposit layer and imparting a considerable pressure drop increase in the region of said deposit. An increase in pressure drop caused by fouling in the top of a catalyst bed limits run length or cycle time within which a unit must be shut down to remove the deposit layer.

In accordance with the present invention encrustation is partially or wholly destroyed by employing a substantially vertical and straight normally closed by-pass standpipe or conduit means which extends completely internally in a reactor vessel having a fixed catalyst bed from a position outside said bed on the inlet side thereof to a position in the interior of said bed. The standpipe is normally closed and only opens upon a predetermined pressure drop. The standpipe is provided with discharge means for discharging by-passed reaction fluid within the inlet 10 percent of said bed, the direction of discharge being countercurrent to normal reactant flow to attack the crust from its underside whereat the crust is most easily fractured. Thereupon, the reaction stream can flow freely through the top of the catalyst bed and no portion of the bed is by-passed. When flow through the top of the bed recommences, the pressure drop across the by-pass conduit decreases and the by-pass conduit falls into substantial disuse.

The straight-through internal by-pass circuit of this invention is normally closed and can be opened manually or automatically upon occurrence of a predetermined pressure drop along a given length of catalyst bed to permit passage of reactants substantially free of catalyst. Either a single or a plurality of parallel internal by-pass circuits can be provided into a given bed. A plurality of parallel internal by-pass circuits can terminate at the same or at differing positions along the length of a bed. Internal by-pass circuits can be psed in more than one bed in the same reactor.

The present invention has a particular and very high utility in the hydrodesulfurization process described below wherein hydrodesulfurization of a crude oil or a reduced crude oil containing the asphaltene fraction proceeds at unexpectedly low temperatures by utilizing a catalyst comprising a Group VI and Group VIII metal on alumina where the catalyst particles are very small and have a diameter between about 1/20 and 1/40 inch. It is shown below that the small size of the catalyst particles permits the use of a surprisingly low temperature to accomplish a given degree of desulfurization but at the same time the small size of the catalyst particles creates a large pressure drop. The present invention thereby has high utility in the hydrodesulfurization process as described below since it can overcome any excessive additional pressure drop increase due to deposit formation upon the small size hydrodesulfurization catalyst particles.

In its preferred embodiment the present invention relates to the use of an internal by-pass method and apparatus as described in a process for the hydrodesulfurization of a crude oil or a reduced crude oil in the presence of a supported Group VI and Group VIII metal hydrodesulfurization catalyst having an exceptionally small particle size such that substantially all or a large proportion of the catalyst particles have a diameter of between about 1/20 and 1/40 inch.

Although nickel-cobalt-molybdenum is the preferred active metals combination for the hydrolesulfurization catalyst, other combinations can be utilized such as cobalt-molybdenum, nickel-tungsten and nickel-molybdenum. Alumina is the preferred supporting material but other non-cracking supports can also be used such as silica alumina and silica magnesia.

Hhydrodesulfurization catalysts comprising supported Group VI and Group VIII metals, such as nickel-cobalt-molybdenum on alumina, having a particle size as small as the catalyst particles of the preferred embodiment of the present invention were not considered advantageous for use in a large or commercial scale because a bed comprising particles of the small size of the preferred embodiment of the present invention induces an extremely high pressure drop, which is highly deleterious to a hydrodesulfurization process which has a limited inlet pressure because the temperature required by a catalyst to accomplish a given degree of desulfurization increases with loss of hydrogen pressure.

The preferred embodiment of the present invention relates to a hydrodesulfurization process in which the small particle size catalyst is utilized in a manner which manifests an unexpectedly high activity so that hydrodesulfurization of crude oil charge to any desired sulfur level, such as a 1 percent sulfur level, proceeds at an unexpectedly low temperature. Although extrapolation of the initial temperature required to produce a liquid product having a 1 percent sulfur content with 1/8 inch diameter and 1/16 inch diameter NiCoMo catalyst particles, which are above the size of the preferred embodiment of the invention, indicates that the temperature requirement would be lower with the small catalyst particles of the preferred embodiment of this invention it was found that the small size NiCoMo catalyst particles permit the use of a hydrodesulfurization temperature which is considerably lower than the temperature which would be expected by extrapolation of the temperature data obtained with larger size catalyst particles. Moreover, the very discovery that hydrodesulfurization with the catalyst of the preferred embodiment of the present invention could be carried out at an unexpectedly low temperature had been obscured by the extremely high pressure drop through a bed of the small size catalyst particles of the preferred embodiment of the present invention. The reason is that in a hydrodesulfurization process pressure drop itself increases the temperature requirement to achieve a given degree of desulfurization usually by an extent which equals or exceeds the temperature advantage due to the small particle size of the preferred embodiment of this invention.

Figure 2:
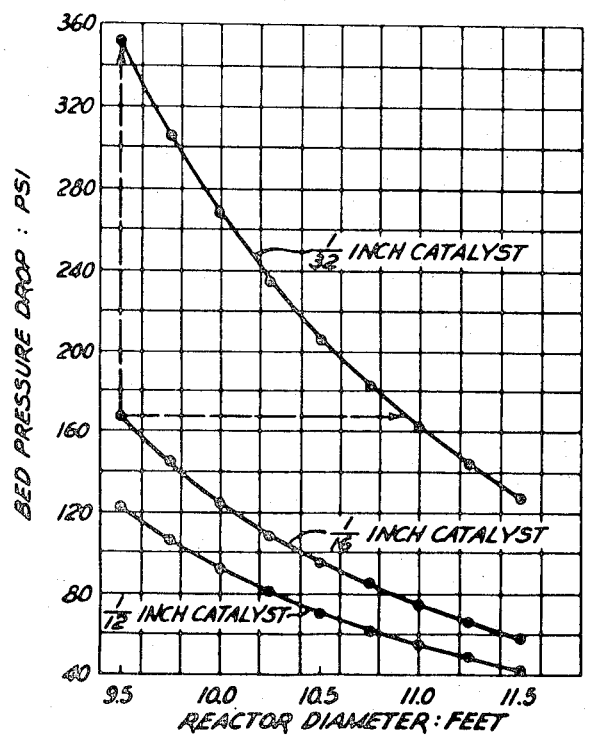

It is seen that there are two unexpected features surrounding the preferred embodiment of the present invention. The first is that there is an unexpectedly great temperature advantage achievable in a hydrodesulfurization process by employing a bed of catalyst having a particle size of the preferred embodiment of the present invention. FIG. 1 shows that the hydrodesulfurization temperature required to produce a residual product having 1 percent sulfur with a $\frac{1}{32}$ inch catalyst is much lower than that would be expected by extrapolation of the line connecting the data obtained with $\frac{1}{8}$ and $\frac{1}{16}$ inch catalyst particles even though the surface area defined by the pores of all three catalysts is about the same. The second feature is that the unexpected temperature advantage is completely disguised by the ordinary approach to its determination, i.e. by making a test in a reactor with relatively large size catalyst particles as a blank and then making a test in the same reactor under the same conditions except that the catalyst particle size is within the range of the preferred embodiment of the present invention (particle size being the only variable changed in the two tests). In this regard, the vertical dashed line in FIG. 2 shows that if a $\frac{1}{16}$ inch catalyst, which is larger than a catalyst of the preferred embodiment of this invention, is tested in a 9.5 foot diameter reactor and then a $\frac{1}{32}$ inch catalyst is tested in the same reactor under unchanged conditions, including an unchanged space velocity, the pressure drop in the $\frac{1}{32}$ inch catalyst bed in the same reactor is so much greater than that for the $\frac{1}{16}$ inch catalyst that the pressure drop increase itself would easily nullify the temperature advantage achievable because of particles size and therefore the advantage of the present invention would be completely masked. The horizontal dashed line of FIG. 2 shows that if the $\frac{1}{16}$ inch catalyst is tested in a 9.5 foot diameter reactor a comparable pressure drop can only be achieved if the $\frac{1}{32}$ inch catalyst is tested in an 11 foot diameter reactor, when both tests are performed at a liquid hourly space velocity of one. Therefore, it is only by making the tests in two different reactors, to equalize pressure drop, that the temperature advantage of the $\frac{1}{32}$ inch catalyst becomes apparent. It is clear that not merely one but rather two variables must be changed to reveal the advantage of the preferred embodiment of the present invention.

Figure 3:
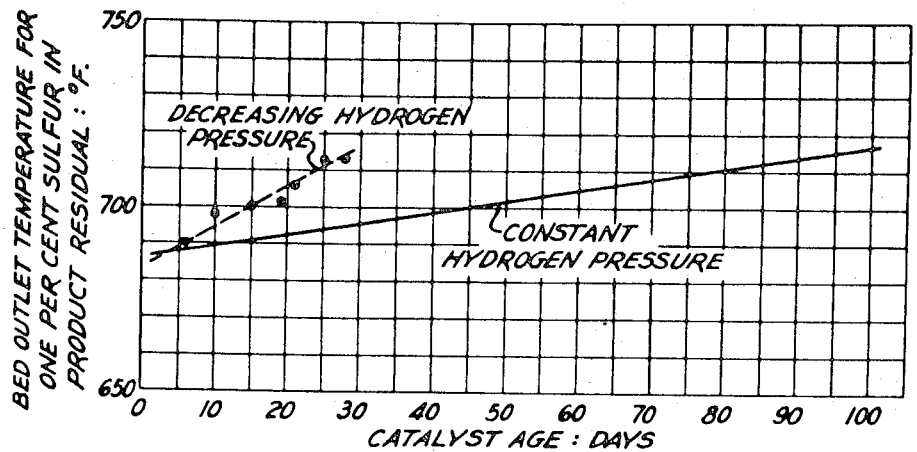

The great effect of pressure drop upon temperature requirements to produce a hydrocarbon product having a 1 percent sulfur content is demonstrated by reference to FIG. 3. In FIG. 3 the solid line represents a hydrodesulfurization process having a constant hydrogen partial pressure of 1830–1850 p.s.i.a. The dashed line represents a decreasing hydrogen partial pressure starting with the 1830–1850 p.s.i.a. range and decreasing to a range of 1720–1740 p.s.i.a. which reduction is caused by the recycle hydrogen stream becoming progressively diluted with other gases. FIG. 3 shows that as the hydrogen partial pressure progressively decreases the temperature required to produce a 1 percent sulfur product progressively increases, so that it is considerably above the temperature required with constant hydrogen partial pressure. Since pressure drop due to flow across a catalyst bed similarly reduces partial hydrogen pressure, FIG. 3 illustrates the detrimental effect upon reaction temperature of pressure drop through a catalyst bed of the preferred embodiment of this invention.

The charge to the process of the preferred embodiment of this invention can be a full crude or a reduced crude containing substantially all of the residual asphaltenes of the full crude. The residual asphaltenes are deficient in hydrogen and comprise only about 10 percent of the charge oil but contain substantially all of the metallic components present in the crude, such as nickel and vanadium. Since the desulfurization catalyst has a greater activity for demetalization than for desulfurization, it removes nickel and vanadium from a charge stock more rapidly than it removes sulfur. These metals deposit most heavily on the outermost regions of the catalyst cross section and tend to reduce the desulfurization activity of the catalyst. Nickel and vanadium removal constitutes substantially the entire deactivation of the catalyst while sulfur and nitrogen removal contributes very little to catalyst deactivation. Furthermore, the asphaltenes comprise the highest boiling fraction of the full crude and contain the largest molecules in the crude. These large molecules are the ones least able to penetrate catalyst pores and most likely to plug these pores. The preferred embodiment of the present invention is directed towards the hydrodesulfurization of a full crude or a residual oil containing substantially the entire asphaltene fraction of the crude from which it is derived and which therefore contains 95 to 99 weight percent or more of the nickel and vanadium content of the full crude. The nickel, vanadium, and sulfur content of the liquid charge can vary over a wide range. For example, nickel and vanadium can comprise 0.002 to 0.03 weight percent (20 to 300 parts per million) or more of the charge oil while sulfur can comprise about 2 to 6 weight percent or more of the charge oil. If an oil containing smaller quantities of nickel, vanadium and sulfur is processed, such as a furnace oil, considerably lower temperature conditions, pressures as low as 1000 pounds per square inch, lower gas circulation rates and hydrogen of lower purity than required by the preferred embodiment of this invention, will suffice to produce a liquid product containing 1 percent sulfur, and therefore the process of the preferred embodiment of the present invention will not be essential.

As the hydrodesulfurization reaction proceeds, nickel and vanadium removal from the charge tends to occur preferentially over sulfur removal. However, deposition of nickel and vanadium upon the catalyst results in a greater degree of catalyst deactivation than does sulfur removal because the removed metals deposit upon the catalyst whereas sulfur removed from the charge escapes as hydrogen sulfide gas. Low hydrodesulfurization temperatures tend to inhibit metal removal from the charge and thereby reduce catalyst deactivation. Since the hydrodesulfurization reaction is exothermic, it is important to quench the reactor to maintain a reaction temperature as low as the small catalyst size of the preferred embodiment of this invention permits to obtain the desired degree of desulfurization in order to inhibit catalyst deactivation. Unnecessarily high temperatures by encouraging catalyst deactivation will result in loss of the initial temperature advantage of the catalyst. Quenching is advantageously accomplished by dividing the total catalyst bed into a plurality of relatively small beds in series and injecting relatively cool hydrogen between the beds, as demonstrated below. It is seen that there is a high degree of interdependence between the use of a high metals content asphaltene charge, the small size catalyst particles, and the use of a quench to insure that the reactor remains at a temperature as low as the catalyst size permits.

The hydrodesulfurization process of the preferred embodiment of this invention employs conventional reaction conditions such as, for example, a hydrogen partial pressure of 1,000 to 5,000 pounds per square inch, generally, 1,000 to 3,000 pounds per square inch, preferably, and 1,500 to 2,500 pounds per square inch most preferably. Reactor design limitations usually restrict inlet pressures under the conditions of the preferred embodiment of the present invention to no more than 2000, 2500, or 3000 p.s.i.g. It is the partial pressure of hydrogen rather than total reactor pressure which determines hydrodesulfurization activity. Therefore, the hydrogen stream should be as free of other gases as possible. Furthermore, since reactor design limitations restrict hydrogen inlet pressures, hydrogen pressure drop in the reactor should be held as low as possible.

The gas circulation rate can be between about 2,000 and 20,000 standard cubic feet per barrel, generally, or preferably about 3,000 to 10,000 standard cubic feet per barrel of gas preferably containing 85 percent or more of hydrogen. The mol ratio of hydrogen to oil can be between about 8:1 and 80:1. Reactor temperatures can range between about 650 and 900° F., generally, and between about 680 and 800° F., preferably. The temperature should be low enough so that no more than about 10, 15 or 20 percent of the charge will be cracked to furnace oil or lighter. At temperatures approaching 800° F. the steel of the reactor walls rapidly loses strength and unless reactor wall thicknesses of 7 to 10 inches or more are utilized a temperature of about 800° F. constitutes a metallurgical limitation. The liquid hourly space velocity in each reactor can be between about 0.2 and 10, generally, between about 0.3 and 1 or 1.25, preferably, or between about 0.5 and 0.6 most preferably.

The catalyst employed in the hydrodesulfurization process is conventional and comprises sulfided Group VI and Group VIII metals on a support such as nickel-cobalt-molybdenum or cobalt-molybdenum on alumina. Suitable hydrodesulfurization catalyst compositions are described in U.S. 2,880,171 and also in U.S. 3,383,301. However, an essential feature of the catalyst particles is that the smallest diameter of these particles is considerably smaller than the diameter of conventional hydrodesulfurization catalyst particles. The smallest diameter of the catalyst particles of the preferred embodiment of the present invention is broadly between about 1/20 and 1/40 inch, preferably between about 1/25 and 1/36 inch, and most preferably between about 1/29 and 1/34 inch. Lower particles sizes would induce a pressure drop which is too great to make them practical. The catalyst can be prepared so that nearly all or at least about 92 or 96 percent of the particles are within the stated range. The catalyst can be in any suitable configuration in which the smallest particle diameter is within the stated range such as roughly cubical, needle-shaped or round granules, spheres, cylindrically-shaped extrudates, etc. By smallest particle diameter we mean the smallest surface to surface dimension through the center or axis of the catalyst particles, regardless of the shape of the particle. The cylindrical extrudate form having a length between about 1/10 and 1/4 inches is highly suitable.

Since the asphaltene molecules which are hydrodesulfurized in accordance with the preferred embodiment of the present invention are large molecules and must enter and leave the pores of the catalyst without plugging the pores, in order to obtain good aging properties most of the pore volume of the catalyst should be in pores above 50 A. in size. Advantageously 60 to 75 percent or more of the pore volume should be in pores of 50 A. or more. Most preferably, 80 to 85 percent or more of the pore volume should be in pores above 50 A. in size. Catalyst having smaller size pores have good initial activity but poor aging characteristics due to gradual plugging of the pores by the asphaltene molecules. For example, catalyst A below exhibited good activity for about one month while catalyst B below exhibited good activity for about three months.

| Pore size—A: | Catalyst A, percent of pore volume | Catalyst B, percent of pore volume |
|---|---|---|
| 200–300 | 1.2 ⎫ | 2.3 ⎫ |
| 100–200 | 4.3 ⎬ 21.7 | 41.7 ⎬ 87.3 |
| 50–100 | 16.2 ⎭ | 43.3 ⎭ |
| 40–50 | 16.4 | 6.4 |
| 30–40 | 2.26 | 5.6 |
| 20–30 | 26.6 | 1.0 |
| 7–20 | 12.5 | 0.0 |

As indicated above, as the diameter of conventional hydrosulfurization catalyst particles progressively decreases within a range which is above the range of the preferred embodiment of the present invention, hydrodesulfurization of a crude oil to a one percent sulfur level proceeds at progressively lower temperature. However, the following tests show that the diminishing of catalyst diameter size to a level within the range of the preferred embodiment of the present invention results in an unexpectedly great reduction in hydrodesulfurization temperature which is much greater than indicated by the particle diameter-temperature relationship exhibited by larger size particles. However, counteracting this temperature advantage is the fact that the small catalyst particle diameters result in a large pressure drop through a catalyst bed comprising them, and this pressure drop tends to nullify the temperature advantage achievable with the catalyst of the preferred embodiment of the present invention because hydrodesulfurization temperature requirements increase as hydrogen partial pressure decrease.

Although it is expected that reduction in catalyst particle size will increase pressure drop, under desulfurization conditions the increase in pressure drop occasioned by using a bed of catalyst particles of the size of the preferred embodiment of this invention as compared to a bed of catalyst particles only slightly larger is great within reactors having moderate diameters. As shown in FIG. 2 the increase in pressure drop occasioned by utilizing the catalyst size of the preferred embodiment of the present invention as compared to slightly higher catalyst sizes can be greatly moderated by utilizing a reactor having a very high diameter such as 10 or 11 feet or more. However, high pressure reactors having large diameters require extremely thick walls, especially under the elevated temperature conditions of the present process.

As indicated above, in the temperature vicinity of 800° F. which is required for hydrodesulfurization of crude oil or reduced crude oil a considerable metallurgical weakening occurs in the steel reactor walls. In order to guard against reactor failures at the 2000 or 2500+ pounds per square inch operating pressures of the process extremely thick steel walls are required, for example, a thickness of 8, 10 or 12 inches. At the reaction temperature of the preferred embodiment of this invention the required reactor wall thickness increases appreciably with relatively small increases in reactor inlet pressure. Furthermore, at any temperature or pressure of the preferred embodiment of this invention the wall thickness required also increases with reactor diameter. Therefore the excessive increase in reactor wall thickness which is required upon any increase in reactor diameter or reactor temperature exerts a practical design limitation upon maximum allowable pressure in a reactor.

The existence of a maximum pressure limitation tends to be prohibitive to the use of a hydrodesulfurization catalyst having a small diameter because a bed comprising such a small catalyst induces a very high pressure drop, diminishing still further the average pressure within the reactor, and the magnitude of this pressure drop is closely related to reactor diameter. For example, FIG. 2 shows that the pressure drop curves for 1/12 inch, 1/16 inch and 1/32 inch catalyst beds are roughly parallel at reactor diameters of 11 feet or greater. However, the pressure drop curve for the 1/32 inch catalyst is much steeper at reactor diameters less than 11 feet than the pressure drop curves for the 1/12 inch and 1/16 inch catalyst. Therefore, for a catalyst of the preferred embodiment of the present invention the diameter of the reactor within the range of conventional reactor sizes has an important effect upon pressure drop.

Since there is a practical limit on reactor inlet pressure, as explained above, due to reactor wall thickness requirements, it is important to hold pressure drop in the reactor as low as possible. In effect there is a pressure squeeze in the system in that inlet hydrogen pressure should be held down while reactor outlet pressure should be as high as possible. Therefore, in reactors having an inlet pressure limitation of about 2000 or 2500 or 3000 p.s.i.g., the diameter to depth ratio of the catalyst bed should be high enough to reduce pressure drop so that the reactor outlet pressure is not more than about 150, 250 or 350 p.s.i.g. lower than the inlet pressure. Control of reactor pressure differential with a high diameter to depth ratio catalyst bed is especially important in single reactor systems capable of accepting only relatively low inlet pressures. The diameter to depth ratio becomes less important in reactors which can accept relatively high inlet pressures or in parallel reactor systems wherein pressure drop can be reduced by diverting a portion of reactant flow to another reactor.

There is an additional problem relating to pressure drop arising when utilizing the very small catalyst particles that is alleviated considerably by utilizing a large diameter reactor or parallel reactors. When catalyst particles having the very small size within the range of the preferred embodiment of this invention, reactant flow through them causes them to shift and scrape against each other in a process of compaction. Scraping of particles against one another result in production of fines which further increases pressure drop. Since a catalyst bed may be in continuous operation for long periods of time, production of fines can be considerable. The use of a large diameter reactor or a parallel reactor system by permitting a greater catalyst cross-section per volume of reactor flow, inhibits fines formation and thereby inhibits an increasing pressure drop across the catalyst field due to this cause.

In accordance with the preferred embodiment of the present invention a hydrodesulfurization catalyst whose diameter is between 1/20 and 1/40 inch which provides an unexpected and substantial temperature advantage due to its size but whose size also induces a large pressure drop in reactors of common or standard size which pressure drop tends to nullify said temperature advantage is arranged in a bed having a sufficiently large diameter to depth ratio to preserve the temperature advantage due to catalyst size. The catalyst can be advantageously divided into separate beds arranged in series to form a reactor train with each succeeding bed in series containing a greater quantity of catalyst than its preceding bed. The total liquid charge stream comprising crude oil or reduced crude oil together with a portion of total hydrogen requirements is charged to the reactor inlet. An effluent stream comprising desulfurized liquid together with gases is withdrawn from the reactor and cooled. Liquid and gases are separated from each other in the cooled effluent stream. Impurities are removed from said effluent gases to provide a recycle hydrogen stream having an increased proportion of hydrogen. The recycle hydrogen is recycled to a plurality of positions in series in the reactor between the separate catalyst beds therein.

Figure 4:
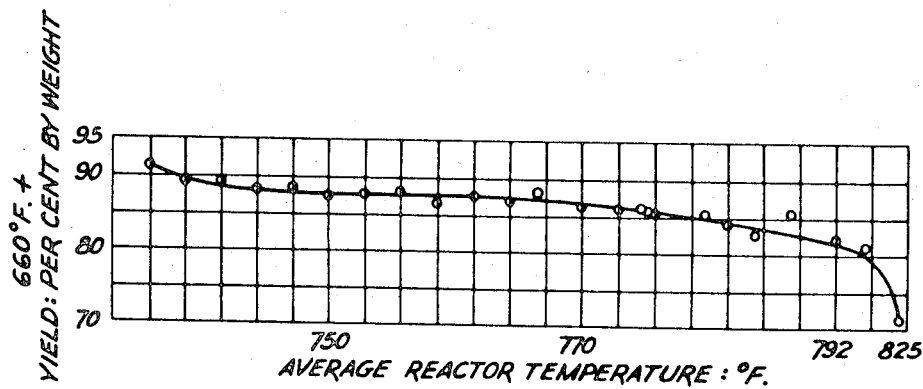

The diameter of the catalyst bed should be adequate to reduce the pressure drop across the catalyst bed sufficiently to permit the reaction to occur near the low temperature level permitted by the small catalyst size. The apportioning of the recycle hydrogen to separate positions in the reactor train rather than total recycle of the hydrogen to the beginning of the reactor serves to minimize overall hydrogen pressure drop in the system. Finally, the apportioning of the recycle hydrogen so that it is injected between the separate catalyst beds permits it to serve as a quench to cool the flowing stream as it passes between catalyst beds, thereby permitting reaction temperature to remain near the low temperature level permitted by the small catalyst size. In the absence of a hydrogen quench as described the temperature increase of reactants across each bed would become cumulative so that neither deep beds nor a number of beds in series could be used. Furthermore, temperatures even slightly higher than necessary are detrimental because, as shown in FIG. 4, moderate temperature elevations considerably enhance thermal cracking of liquid producing among other products light hydrocarbon gases which dilute the hydrogen stream and reduce the partial pressure of hydrogen therein.

The hydrogen quench by reducing the actual temperature also reduces the required temperature and therefore cooperates interdependently with the small catalyst particles of this invention. By lowering the temperature, the hydrogen quench reduces cracking which would consume hydrogen and produce light hydrocarbon gases leading to a lower hydrogen concentration, which in turn would reduce the hydrogen partial pressure and increase the required reaction temperature.

It is seen that the feature of catalyst beds having a high diameter to length ratio arranged as a plurality of separate catalyst beds in series and the feature of recycle hydrogen injection between the separate catalyst beds function highly interdependently with respect to each other and with respect to the use of the small catalyst particle size of this invention. The small catalyst particle size permits hydrodesulfurization to occur at an unexpectedly low temperature level but imposes a high pressure drop which tends to nullify the temperature advantage. The use of a catalyst bed having a large diameter reduces the pressure drop in the liquid flow stream while the use of separate catalyst beds in series with injection of recycle hydrogen between the beds serves not only to reduce the pressure drop of the hydrogen flowing through the system but also serves to quench reactant temperature along the length of the reactor. As stated above, the quenching effect inhibits thermal cracking of liquid and thereby avoids hydrogen consumption for cracking and excessive dilution of the hydrogen stream with light hydrocarbon gases which would reduce the partial pressure of the hydrogen stream, thereby also tending to nullify the advantageous temperature effect of the small particle size catalyst.

The present invention provides a means for reducing the pressure drop across the catalyst bed in a hydrodesulfurization operation, regardless of the configuration of the catalyst bed, thereby tending to enhance the temperature advantage of a small particle size catalyst. As explained above, the small size of the catalyst particles permits a reduced temperature to accomplish any given degree of desulfurization at a given pressure, but this advantage is only maintained as long as the inlet hydrogen pressure is not unduly dissipated by pressure drop. It was explained that the reduced temperature advantageously inhibits the rate of demetalization. However, some demetalization and its concomitant deactivation of catalyst cannot be avoided. The demetalization results in an accumulation of metallic deposits upon the surface of the catalyst and while this accumulation extends through the bed depth it is especially heavy in the uppermost layer of the small particle size catalyst bed and tends to diminish with bed depth.

The small catalyst particle size provides relatively small interstitial spaces between adjacent catalyst particles for passage of a liquid-vapor mixture of hydrocarbon together with hydrogen. As the reaction proceeds accumulation of metallic deposits upon the surface of the catalyst further reduces the clearances between adjacent catalyst particles particularly at the uppermost layer of the bed until the uppermost layer of the bed effectively becomes a filter for solids carried by the crude or reduced crude feed. When this occurs, the solids in the feed oil become entrapped between adjacent catalyst particles at the uppermost region of the catalyst bed, i.e. the uppermost 1 or 5 percent by volume of the bed, crust formation occurs and a significant pressure drop ensues across this crust.

Because the feed to the preferred embodiment of this invention is a crude oil or a reduced crude it contains not only nearly all of the metals, such as nickel and vanadium, but also nearly all of the solids originally present in the crude, which solids principally include carbon, various salts and iron compounds. At the outset of operations the clearances between adjacent catalyst particles in the small particle size catalyst bed are sufficiently great for these suspended solids to pass through the bed substantially unobtructed, without crust formation occurring and without a detectable pressure drop increase due to trapping of solids within the catalyst bed. It is evidently due to reduced clearances between adjacent catalyst particles caused by gradual metal accumulation upon the catalyst that eventually causes the bed to become a filter for incoming solids. Therefore, it is only after an extened period of operation that crust formation occurs before which no pressure drop increase due to this effect is observable and after which a pressure drop increase becomes rapidly discernible.

There is a high degree of feedback between the onset of crust formation and the furtherance of catalyst metal contamination. It has been shown above that metals removal from the feed oil is inhibited by the lower temperatures permitted by the small particle size catalyst. However, when gradual accumulation of metals triggers filter formation with ensuing solid entrapment, the resultant increase in pressure drop ncessitates a higher operating temperature (see FIG. 3). The higher temperature in turn accelerates metal accumulation on the catalyst. It is seen that the problem feeds upon itself. It is obvious from the foregoing discussion that the hydrodesulfurization process is not limited by catalyst activity as are most catalytic processes, but rather by pressure drop. Therefore, the purpose of this invention is to delay or prevent inception of filter bed conditions.

In accordance with the present invention a substantially vertical and straight normally closed by-pass standpipe or conduit means is provided which extends completely internally in a reactor vessel having a fixed catalyst bed from a position outside said bed on the upstream side thereof to a position in the interior of said bed. No catalyst is added or removed during the process and no catalyst travels through the conduit. The terminus of said conduit means is provided with additional means to preferably disperse the fluid radially and then to reverse the direction of flow of the initial by-passed fluid path so that the fluid flowing in said conduit means is discharged in an upstream end of the catalyst bed. Upon occurrence of a predetermined pressure drop between the reactor inlet and the mined pressure drop between the reactor inlet and the conduit discharge opening, a rupture disk or a pressure actuated valve opens to pass at least a portion of the reactant mixture through the standpipe, to the interior of the bed and thence to opening means within the bed and very close to the top thereof (i.e. in the upper 1 or 5 volume percent of the bed) to discharge the fluid flowing in the pipe against the downstream surface of any crust formed at the top of the bed to destroy said crust by dislodgement of solids constituting said crust thereby permitting the main reaction stream to be readmitted through the top of the bed at a greatly reduced or normal pressure drop.

The method and apparatus of the present invention operates with the greatest sensitivity when the discharge ports of the by-pass pipe are disposed in the upstream 1 or 5 percent by volume of the catalyst bed, preferably in the upstream one percent but at least in the upstream 10 percent of the catalyst bed. Under this arrangement the discharge ports are most sensitive to formation of crust and associated pressure drop, are most effective in correcting a crust formation situation and, if several separate by-pass systems are utilized, each operates most independently of of the others and in closer response to its own localized crust formation situation.

As noted above, at the beginning of the hydrodesulfurization reaction solids contained in the feed are provided with adequate interstitial space between catalyst particles to pass through relatively unobstructed. As the reaction proceeds dissolved metals such as nickel and vanadium gradually deposit upon and coat the catalyst particles to progressively diminish the interstitial spaces until the feed solids can no longer pass through but instead become lodged in the catalyst. Because the upstream catalyst region contains the greatest concentration of removed metal, in a downflow operation it is the upper tier of catalyst particles that effectively develops into a filter in which the incoming deposits become lodged.

When incoming deposits become lodged in the upper tier of catalyst particles, further flow of feed only tends to wedge the deposits increasingly tightly between the catalyst particles. Therefore, as the process continues the pressure drop rapidly increases once it starts to rise due to the wedging effect. The deposits become lodged increasingly tightly between adjacent catalyst particles much in the manner of a tapered cork in a thin bottle neck. However the present invention utilizes the observation that while a great pressure above a tapered cork will not force it through a narrow bottle neck, a relatively smaller force from below the cork will readily dislodge it and free the bottle opening.

The effect of the present invention will be the greatest if the by-pass line discharge openings are disposed so close to the top tier of the catalyst bed that as the crust forms a portion of it will advance into and obstruct the discharge openings. When this happens the pressure drop across the by-pass system will advance abruptly, rupture the disk and cause a surge of reactant fluid to rush against the underside of the logdged particles. It is evident that this backward surge of fluid will have the greatest effect upon dislodgement if the by-pass discharge openings are very close to the lodged particles. Furthermore, when the by-pass discharge openings are very close to the region of greatest encrustation the backward surge of fluid against the crust distrubs the catalyst particles themselves in the very limited region wherein encrustation occurs so that any tightly wedged particles become loosened and any particle-to-particle cementing that occurred is disturbed. It is apparent that very close proximity of the discharge openings to the zone of encrustation provides a dual, interrelated advantage in that the by-pass line pressure drop is most rapidly and affirmatively affected by crust formation because the crust can actually contact and at least partially block to discharge openings and thereupon, upon disk failure, the effect upon destruction of the crust is greatest because the by-passed fluid is discharged directly into the crust with a minimum pressure drop in transit to the crust so that particle dislodgement and anti-cementing catalyst movement can be effected to the greatest possible extent.

Disposition of the by-pass discharge openings directly in the region of crust formation provides an important advantage in a reactor employing a plurality of by-pass systems rather than a single by-pass system. When a plurality of by-pass systems are utilized, even though the rupture disk of each is set to fail at about the same pressure drop, all the disks will not fail at the same instant because of unavoidable structural differences in the disks but one will fail in advance of the others thereby tending to increase the generalized pressure below the crust which in turn tends to retard failure of the remaining rupture disks. However, if the discharge openings of each remaining by-pass conduit are sufficiently close to the top tier of the catalyst bed so that its openings can be obstructed by a developing crust, the prior failure of another disk will not be able to prevent development of a sufficient pressure drop across every other by-pass conduit to cause the other disks to subsequently fail. In this manner, operation of each by-pass system will be relatively immune from operation of any other and each system will fail substantially independently of prior failure of other disks and therefore each by-pass system can be effective in disrupting encrustation in its respective locale to avoid major channeling through the catalyst bed.

As shown in FIG. 2, at reactor diameters below about 11 feet, the pressure drop through the 1/32 inch catalyst bed of the present invention increases extremely rapidly with reduction in reaction diameter at the indicated space velocity. However, in the diameter range shown the pressure drops through a 1/16 inch catalyst bed and a 1/12 inch catalyst bed, which are both above the range of the preferred embodiment of this invention, are not nearly as sensitive to reduction in reactor diameter below 11 feet. FIG. 2 also shows that at reactor diameters above 11 feet the pressure drop through a 1/32 inch catalyst bed is not significantly more sensitive to changes in reactor diameter than are the pressure drops through the 1/12 inch catalyst. Therefore, there is a much more sensitive pressure drop relationship between a 1/32 inch catalyst bed of this invention at the reactor diameters shown in FIG. 2 than there is with beds of larger size catalyst particles. However, at the high temperature and pressure conditions of the hydrodesulfurization process of the preferred embodiment of this invention metallurgical requirements require reactor walls of great thickness at reactor diameters of 11 feet or more, reactor wall thickness requirements increasing with increasing reactor diameter, so that economic considerations prohibit reactor diameters much large than 11 feet in the process of this invention. Therefore, with a 1/32 inch catalyst bed in order to accommodate charge rates which would require a reactor diameter much greater than 11 feet, it is necessary to utilize a parallel reactor system. FIG. 2 clearly indicates that at the indicated space velocity and with the reactor diameters shown a criticality regarding pressure drop sensitivity arises when employing a 1/32 inch catalyst bed which is far greater than in the case of the 1/12 inch and a 1/16 inch catalyst bed.

All of the tests indicated in FIG. 2 for the various catalyst sizes were made at the same liquid hourly space velocity. Therefore, in the tests within a reactor of relatively large diameter, the catalyst bed depth was relatively shallow. In the tests within a reactor of relatively small diameter, the catalyst bed was deeper. FIG. 2 shows that in utilizing a 1/32 inch catalyst rather than a larger size catalyst, the catalyst bed configuration must provide a diameter which is sufficiently great that the pressure drop is held at a level low enough to retain the advantage of the lower hydrodesulfurization temperature possible with said catalyst. Therefore, when utilizing a bed of small size catalyst particles of the preferred embodiment of the present invention the configuration of the bed is important and the ratio of diameter to depth of the bed must be sufficiently high to retain the temperature advantage of the catalyst bed.

Figure 5:
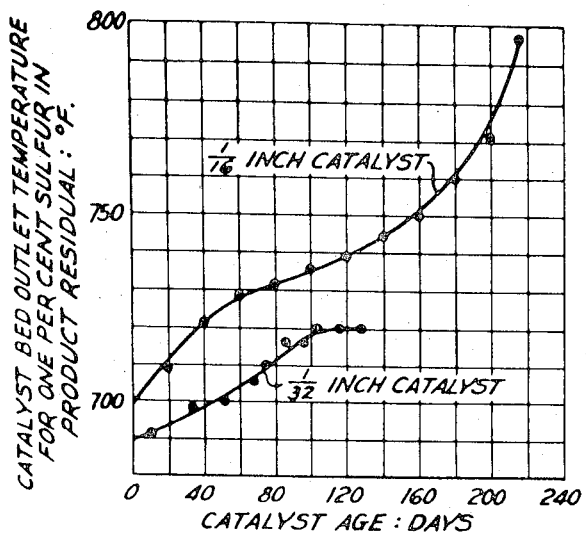
Figure 6:
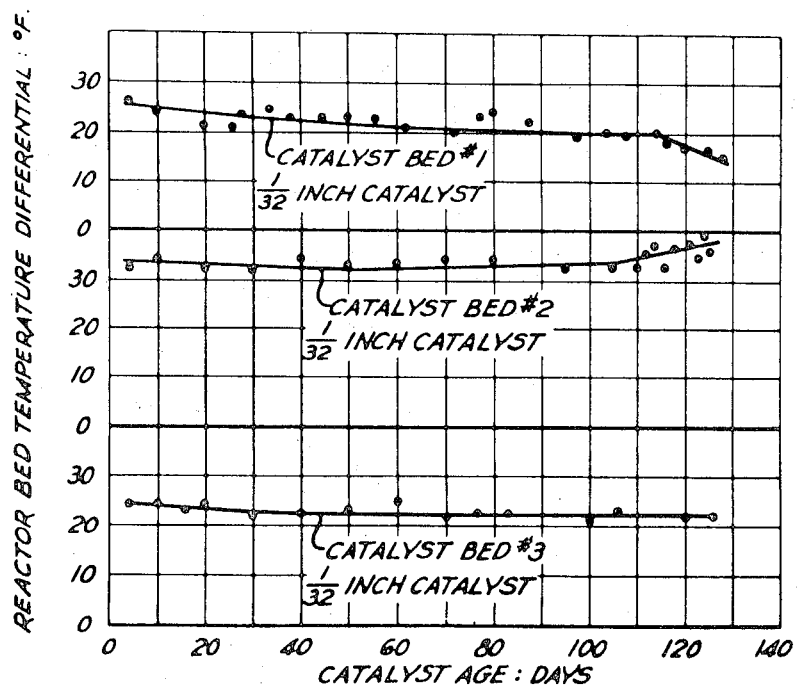

Tests were made which demonstrate that a 1/32 inch nickel-cobalt-molybdenum on alumina extrudate is not only capable of hydrodesulfurizing a reduced crude oil to a one percent sulfur level at a considerably lower initial temperature than a similar catalyst in the form of a 1/16 inch extrudate but also is capable of maintaining a lower hydrodesulfurization temperature with age. The tests with the 1/32 inch catalyst were based on a 0.55 liquid hourly space velocity and a hydrogen partial pressure of 1830 pounds per square inch. The reactor pressure drop was about 50 pounds per square inch. The charge was a 50 percent Kuwait reduced crude. The reaction was performed in a single reactor having three separate beds and recycle hydrogen gas was used as a quench after each bed. There was no separate guard chamber before the reactor. The first, second and third beds contained 13.3 percent, 41.6 percent and 45.1 percent of the total catalyst, respectively. Typical data for the test utilizing the 1/32 inch catalyst are shown below and the general data are illustrated in FIGS. 5 and 6. FIG. 5 shows the aging characteristics for the entire 1/32 inch catalyst reactor as compared with a comparable aging run with a 1/16 inch catalyst reactor. FIG. 6 shows the aging characteristics for the individual beds within the 1/32 inch reactor and shows that when the first bed becomes deactivated the second bed assumes a greater desulfurization load.

Figure 7:
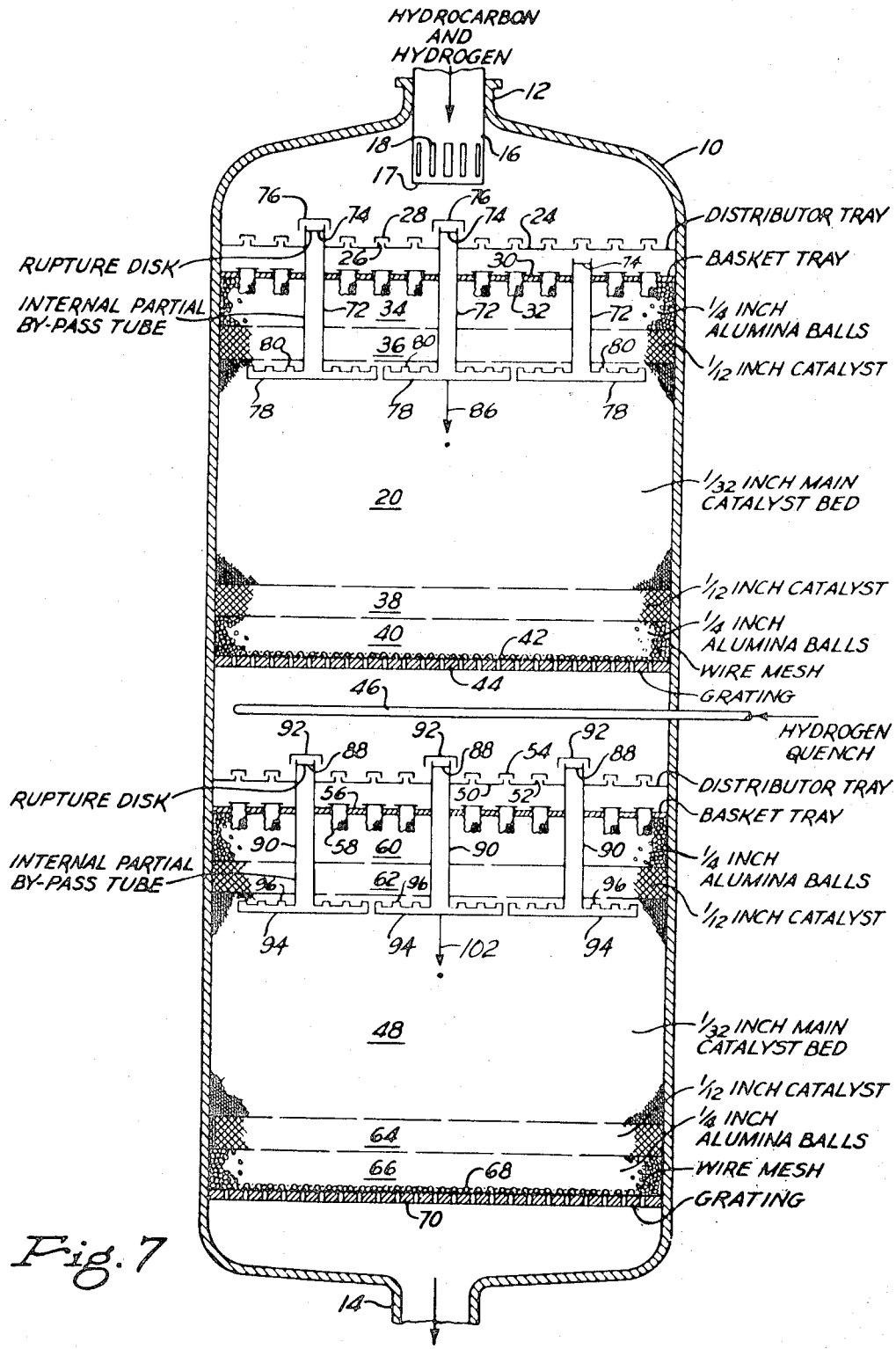

FIG. 7 illustrates in detail the internal by-pass arrangement in a hydrodesulfurization reactor for the above-described process. FIG. 7 illustrates the use of a partial by-pass arrangement employing a plurality of by-pass tubes each equipped with a rupture disk. Each tube extends from above the inlet end of a catalyst bed to a position in the interior of the catalyst bed slightly below the top of the main bed portion in order to by-pass the top 1 or 5 volume percent of the main catalyst bed portion wherein most of the deposit formation occurs. When the pressure drop across the deposit formation exceeds the pressure rating of the rupture disk the disk will break permitting reactants to enter directly into the interior of the catalyst bed close to the relatively easily fracturable underside of the crust.

FIG. 7 shows that the internal by-pass apparatus of the present invention is capable of diverting all or a portion of a reactant stream through the crust of a catalyst bed in a straight-through path and is then capable of discharging the by-passed reactants against the underside of the crust to fracture or destroy said crust and agitate the catalyst particles in the region of the crust to disrupt any cementing action between said particles.

FIG. 7 shows an elongated reaction chamber 10 having an upper inlet port 12 and a lower discharge port 14. A pipe 16 extends through inlet port 12 and is provided with elongated terminal slots 18 which provide a larger discharge area than would be provided by an open-ended pipe and provide improved feed distribution, permitting the terminus of pipe 16 to be closed by plate 17.

The reaction chamber of FIG. 7 is provided with two separate catalyst beds comprising NiCoMo on alumina particles, although three or more beds could be employed. FIG. 7 shows an upper main catalyst bed 20 of 1/32 inch particles and a lower main catalyst bed 48 of 1/32 inch particles. Incoming hydrogen and hydrocarbon vapors are dispersed laterally in all directions through slots 18, and passed through a distributor tray 24 containing a plurality of chimneys 26 each having a cover or baffle plate 28 disposed above and separated from its associated chimney to prevent liquid from dropping into the chimney but permitting the passage of vapor therethrough. The distributor tray is employed to prevent channeling of incoming reactants through the catalyst bed and allows an even distribution of reactants along the entire cross-section of the catalyst bed. The chimneys are provided on the distributor tray to provide surrounding low areas in which any hydrocarbon material in the liquid state can accumulate so that only gaseous material is likely to travel between the top of each chimney and its associated cover plate. Once beyond distributor tray 24, incoming reactants will encounter basket tray 30 into which are inserted a plurality of wire mesh baskets 32 which are immersed in a bed 34 of 1/4 inch alumina balls. The wire mesh baskets 32 are provided to remove some of the solids which might cause plugging of the main catalyst bed 20. Bed 34 of 1/4 inch alumina balls rests upon bed 36 of 1/12 inch catalyst. Beds 34 and 36 are each adapted to remove any materials which might cause plugging of the main catalyst bed 20 and also to provide porous regions of relatively small pressure drop in advance of the main catalyst bed. Beds 34 and 36 also provide weight upon main catalyst bed 20 to prevent shifting of particles in the main bed which could lead to abrasion of particles in the main bed and fines formation therein, thereby increasing the pressure drop. Main catalyst bed 20 is followed by bed 38 of 1/12 inch catalyst which in turn is followed by a bed 40 of 1/4 inch alumina balls which rests upon a wire mesh 42 which in turn is supported by a grating 44.

Reactants and reaction products leave the upper catalyst bed in a heated condition due to the exothermic nature of the hydrodesulfurization reaction and are quenched by hydrogen charged through a sparger tube 46 and then continue their transit towards lower or downstream main catalyst bed 48. The arrangement of the lower catalyst bed is substantially identical to that of the upper catalyst bed. The lower catalyst bed is provided with a distributor tray 50 and a plurality of chimneys 52 each equipped with a cover plate 54. Beneath the distributor tray is a basket tray 56 which supports a plurality of wire mesh baskets 58. The baskets are embedded within a bed 60 of ¼ inch alumina balls which overlies a bed 62 of ½ inch catalyst. Below the main catalyst bed 48 is a bed 64 of ⅟₃₂ inch catalyst followed by a bed 66 of ¼ inch alumina balls which in turn rests upon a wire mesh 68 supported by a grating 70.

The upper main catalyst bed 20 is provided with one or more vertical internal partial by-pass standpipe tubes 72 each having a rupture disk 74 near the top thereof and each having a cover plate 76 above and separated therefrom, except if a rupture disk 74 is disposed below distributor tray 24, as indicated by the right-hand standpipe in FIG. 7, no cover plates 76 is required. The bottom of each internal by-pass tube 72 is provided with straight or circular lateral distributor arms 78 provided with a plurality of discharge ports 80 to discharge fluid in an upstream direction. Distributor arms 78 can be of any suitable configuration to expose most or all of the cross-section of the crust to the by-pass fluid.

Rupture disk 74 can be constructed to blow or rupture at any desired pressure drop between its upper surface and the lower region of tube 72. Also, each rupture disk can be constructed to blow at a predetermined pressure drop across the main bed, such as about 20, 50 or 75 p.s.i.g. Each rupture disk 74 can be constructed to break at the same pressure differential or the various rupture disks in the same catalyst bed can be constructed to break at different pressure differentials. After a disk blows, incoming vapors will flow through its associated standpipe since it constitutes a path of least resistance into the catalyst bed. If desired the bottom terminus of the various by-pass standpipes, the lateral arms 78 and the discharge openings 80 can extend to the same depth in the catalyst bed 20 or to differing depths in the bed 20. For example, the middle internal by-pass tube shown in bed 20 can extend to the depth in the catalyst bed shown or it can extend to the deeper depth indicated by arrow 86. Generally, it will only be necessary for internal by-pass tubes 72 to extend about a few inches below the surface of main catalyst bed 20, in order to avoid most of the pressure drop due to the deposit formation and in order to be most effective in disrupting any crust which is formed. The depth to which the by-pass tube extends into the main catalyst bed will be about the top 1 or 10 percent of the bed, generally, or 2 or 5 percent of the bed, since this upper zone is the region at which most fouling is likely to occur.

If desired only the upper catalyst bed can be provided with internal by-pass tubes. However, it is possible for the lower catalyst bed also to be provided with internal by-pass tubes adapted so that the rupture disks therein will blow at a later time in reactor operation when and if fouling of the second bed should occur due to extensive by-passing of reactants through the first bed. Therefore, rupture disks 88 can blow when excessive deposit formation occur at the upper region of lower main catalyst bed 48. Lower by-pass tubes 90 are generally similar to the upper internal by-pass tubes 72. Each lower by-pass tube 90 is provided with a rupture disk 88 and an overhead cover 92. The lower end of each tube 90 is provided with straight or circular lateral distributor arms 94 provided with a plurality of discharge ports 96 to discharge fluid in an upstream direction. The lower portion of internal by-pass tubes 90 can terminate at the same depth within main catalyst bed 48 or one or more tubes can terminate at another depth, as indicated by arrow 102. Also, all of the lower bed rupture disks 88 can be constructed to fail at the same pressure drop or they can be constructed to fail at differing pressure drops.

Although not shown, the reactor of FIG. 7 can be provided with pressure sensing means to determine the pressure differential between the upper portion of any catalyst bed and any point along the depth of the bed to determine the time at which failure of the various rupture disks can be expected to occur.

There are other embodiments of the present invention not shown in FIG. 7. For example, the middle by-pass tube 72, instead of terminating within reactor 10, as shown, can extend up into feed inlet conduit 16 to a zone therein at which the feed is at a higher pressure than it is after expanding into reactor 10. In this case, when disk 74 of tube 72 ruptures fluid at a pressure higher than reactor pressure will be available for discharge through ports 80. To obtain fluid at a still higher pressure at ports 80, middle conduit 72 can extend up into feed conduit 16 until conduit 72 is out of the reactor and then conduit 72 can extend through the wall of the conduit 16 and run all the way back to the feed hydrocarbon or feed hydrogen compressor. In this manner, no weakening will be imported to high pressure reactor 10 by permitting conduit 72 to extend through the wall thereof. In the systems utilizing an elongated conduit 72 either a rupture disk or a valve can be utilized to admit fluid to ports 80.

We claim:

1. In a process wherein solids-containing reaction fluid is passed downwardly in a reactor through a fixed catalyst bed so that solids in said fluid causes crust formation at the bed inlet and increases pressure drop within the catalyst bed, the improvement comprising conduit means within said catalyst bed for discharging said fluid in said bed in an upwardly direction, said pressure drop increase actuating a pressure-drop responsive means to provide a by-pass surge of reaction fluid into said conduit means into the interior of said catalyst bed, reversing the flow of said by-passed surge of fluid in said conduit means in the interior of said catalyst bed to direct it from said conduit means against the downstream side of the crust to dislodge the solids constituting said crust, said dislodgement reducing the pressure drop within said catalyst bed to improve downward flow of said fluid through said catalyst bed.

2. The process of claim 1 wherein said by-pass fluid is taken from a source above reactor pressure.

3. In a process wherein a deposits-containing reactant fluid is passed downwardly through a reactor containing a fixed catalyst bed, wherein the inlet end of said catalyst bed tends to acquire deposits which create a crust and which increase the pressure drop within the catalyst bed, the improvement which comprises conduit means in the interior of said catalyst bed for discharging said fluid in said bed in an upwardly direction, said pressure drop increase within said bed actuating a pressure-drop responsive means to provide a by-pass of at least a portion of said reactant fluid into said conduit means into the interior of the fixed bed, reversing the direction of flow of by-passed fluid in said conduit means in the interior of the fixed bed by discharging the fluid from said conduit means against the downstream side of said crust to dislodge said deposits, said dislodgement reducing the pressure drop within said catalyst bed to improve downward flow of said reactant fluid through said catalyst bed.

4. The process of claim 3 wherein said by-pass fluid is taken directly from the inlet end of said bed.

5. The process of claim 3 wherein said by-pass fluid is taken from a source above reactor pressure.

6. The process of claim 3 wherein said by-pass step is initiated by failure of a rupture disk.

7. The process of claim 3 wherein said by-passed fluid is discharged against the downstream 1 percent by volume of the catalyst bed.

8. The process of claim 3 wherein said by-passed fluid is discharged against the downstream 5 percent by volume of the catalyst bed.

9. The process of claim 3 wherein said by-passed fluid is discharged against the downstream 10 percent by volume of the catalyst bed.

10. The process of claim 3 wherein separate portions of the reaction fluid are by-passed from the inlet end of said bed and directed against separate areas of the downstream side of said crust.

11. A process for the hydrosulfurization of a crude oil or a reduced crude oil containing the deposits-containing asphaltene fraction of the crude comprising passing a mixture of hydrogen and said crude oil into a reactor at an inlet pressure no greater than about 3,000 p.s.i.g. downflow through a fixed bed of Group VI and Group VIII metal hydrodesulfurization catalyst on a non-acidic support, the particles in said catalyst bed being between about 1/20 and 1/40 inch in diameter, the inlet end of said catalyst bed acquiring deposits and forming a crust therein which increases the pressure drop within said catalyst bed, conduit means in the interior of said catalyst bed for discharging said mixture in said bed in an upwardly direction, said pressure drop increase actuating a pressure-drop responsive means to provide a by-pass of at least a portion of said mixture into said conduit means into the interior of the fixed bed, reversing the direction of flow of by-passed mixture in said conduit means in the interior of the fixed bed by discharging said mixture from said conduit means against the downstream side of said crust to dislodge said deposits, said dislodgement reducing the pressure drop within said catalyst bed to improve downward flow of said mixture through said catalyst bed.

12. The process of claim 11 wherein said by-pass mixture is taken directly from the inlet end of said bed.

13. The process of claim 11 wherein said by-pass mixture is taken from a source above reactor pressure.

14. The process of claim 11 wherein the by-passed mixture is discharged against the downstream 5 percent by volume of the catalyst bed.

15. The process of claim 11 wherein said by-pass step is initiated by failure of a rupture disk.

16. The process of claim 11 wherein said by-pass step is controlled by means of a valve.

17. The process of claim 11 wherein separate portions of said mixture are by-passed entirely within the reactor from the inlet end of said bed and directed against separate areas of the downstream side of said crust.

References Cited

UNITED STATES PATENTS

| | | | |
|---|---|---|---|
| 3,607,000 | 9/1971 | Beal et al. | 208—216 |
| 3,598,539 | 8/1971 | Pizzato | 208—146 |
| 3,560,167 | 2/1971 | Bruckner et al. | 23—288 R |

DELBERT E. GANTZ, Primary Examiner

G. J. CRASANAKIS, Assistant Examiner

U.S. Cl. X.R.

208—146; 23—288 R